May 8, 1951  E. MITTELMANN  2,551,756
HIGH-FREQUENCY HEATING METHOD AND APPARATUS
Filed July 21, 1944  3 Sheets-Sheet 1
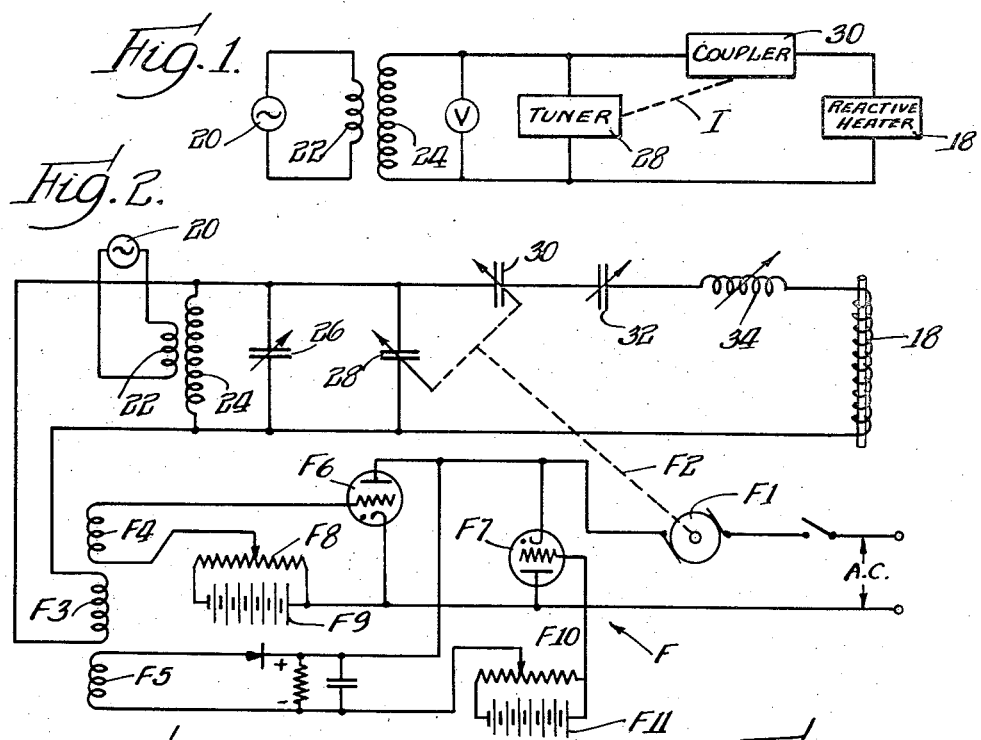
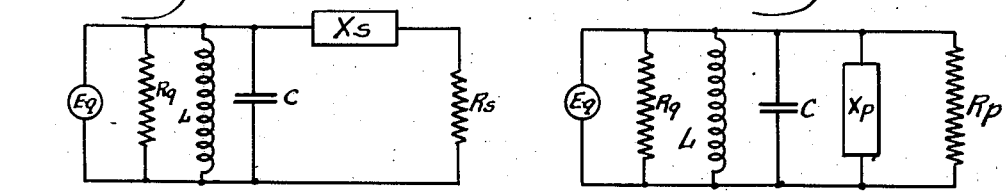
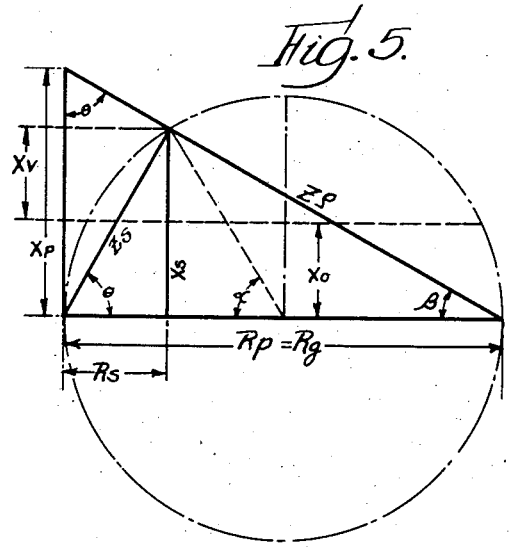
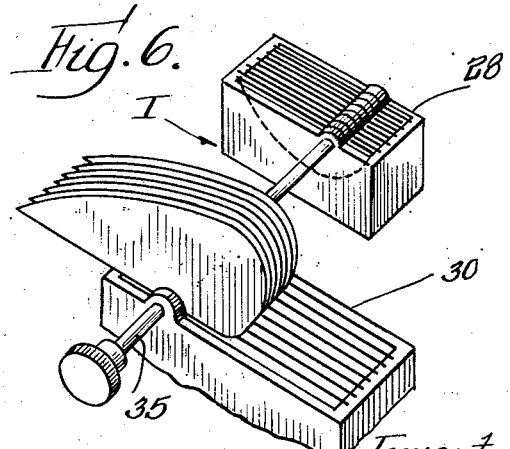
Inventor
Eugene Mittelmann
By Maurice S. Cayne atty.

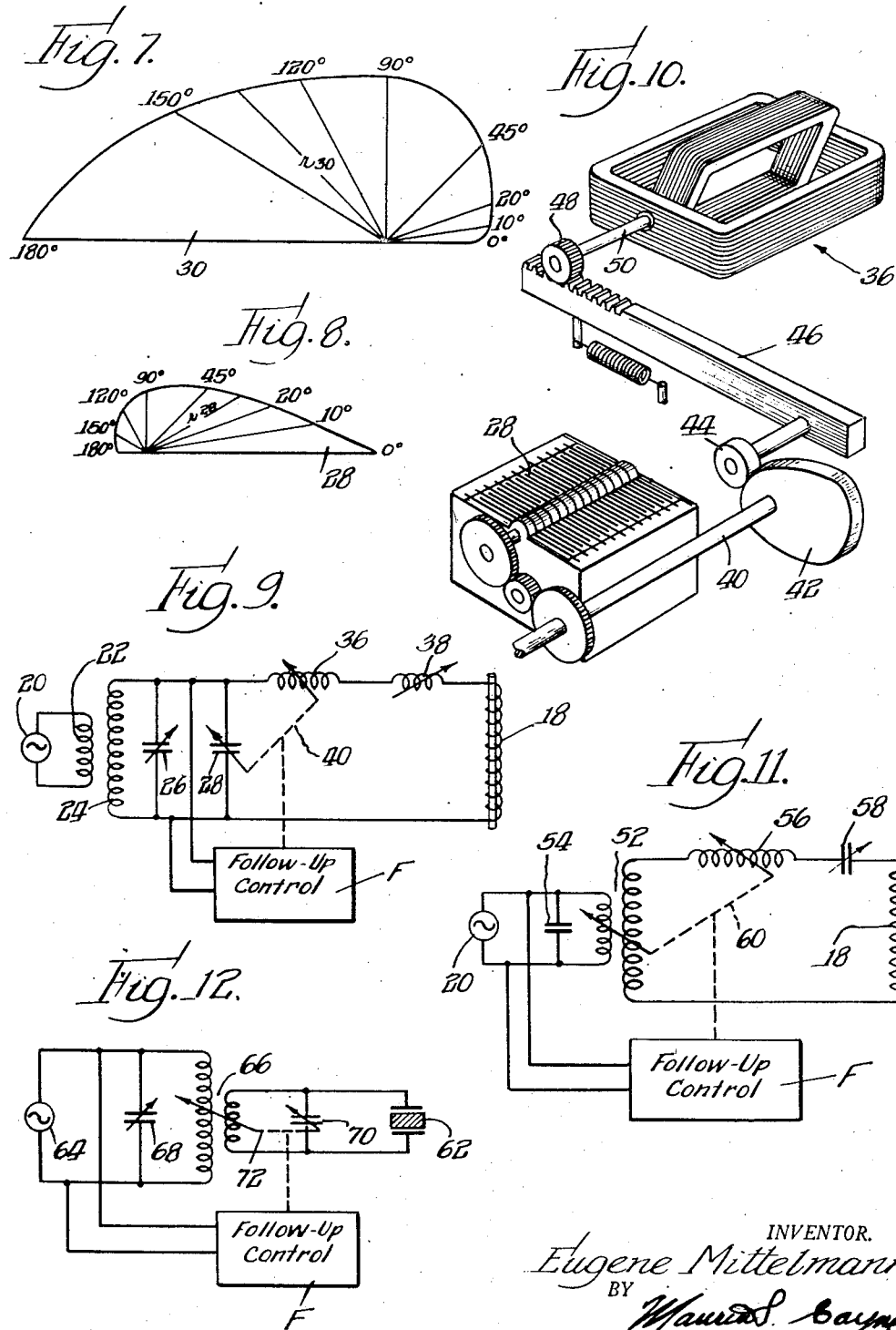

May 8, 1951 E. MITTELMANN 2,551,756
HIGH-FREQUENCY HEATING METHOD AND APPARATUS
Filed July 21, 1944 3 Sheets-Sheet 3
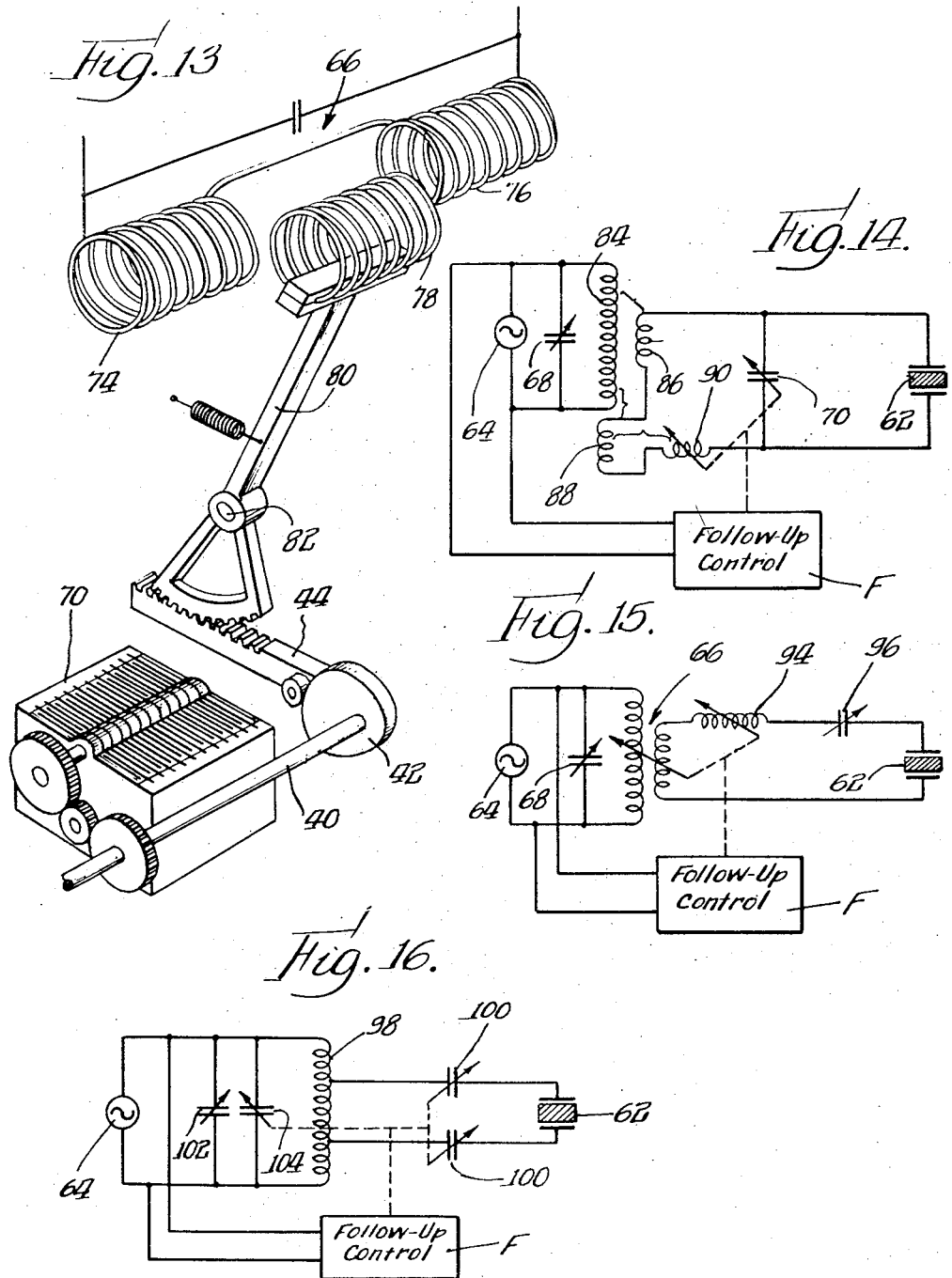
INVENTOR.
Eugene Mittelmann Patented May 8, 1951

2,551,756

UNITED STATES PATENT OFFICE 2,551,756

HIGH-FREQUENCY HEATING METHOD AND APPARATUS

Eugene Mittelmann, Chicago, Ill.

Application July 21, 1944, Serial No. 545,918

2 Claims. (Cl. 219—13)

This invention relates to a combined rematching and retuning device for a variable load, high frequency electric apparatus, and particularly to high frequency heating equipment.

It is an object of my invention to provide means to secure and maintain an optimum transfer of energy from a high, fixed or constant, frequency generator to a variable impedance load. More particularly it is an object of the invention to provide means for continuously compensating for changes in the impedance of a reactive heater as the object or material therein is heated so as to maintain throughout the entire heating operation an optimum transfer of energy to the object or material from a fixed or constant frequency generator.

To secure optimum transfer of energy from a high frequency generator to a load, the impedance of the load must be matched to the internal impedance of the generator. Matching of a variable load impedance to the generator impedance may be effected by varying the degree of coupling between the generator and the load. When resonant conditions are maintained in the circuit, it is sufficient to make the equivalent parallel loss resistance of the load equal to the internal resistance of the generator—a condition which may be obained by adjusting the coupling to bring the load voltage to a predetermined value.

Changes in degree of coupling necessarily change the natural frequency of the load circuit. This has a number of objectionable effects. If the generator is a self-excited oscillator, substantial changes in the frequency of operation occur, except when the coupled reactance forms only a small part of the reactance of the frequency determining circuit. Such frequency changes make the operation of the oscillator less efficient and may cause interference with radio transmission or reception. Where a fixed frequency machine generator is used, and where the load is so coupled to a self-excited oscillator that the load impedance does not exert any frequency determining effect on the oscillator, the change in the natural frequency of the load circuit throws this circuit out of resonance with the generator and causes a large decrease in power transfer and changes in value and phase of the load voltage and current, which make it impossible to use load voltage or current to control matching conditions.

Objectionable changes in the natural frequency of the load circuit on changes in coupling could be avoided by providing a variable tuning reactance if some means were available to govern the adjustment of this device in relation to the changes in coupling so as to maintain the circuit resonant to a constant frequency as the coupling is changed. Since the load voltage and current are changed both by changes in the coupling reactance and by changes in the tuning reactances neither the load voltage nor the current can serve as a guide for separately adjusting both of the reactances to the correct values.

My invention overcomes this difficulty by providing an operative interconnection between two variable reactance devices, one of which is connected in series with the load and the other in parallel with the series combination of load and coupling reactance. The interconnection makes the reactance of one of these devices a predetermined function of the reactance of the other. This function is such that, when the reactance device which controls the degree of coupling is adjusted to rematch the load impedance to the generator impedance after a change in load impedance, the other reactance device is simultaneously and automatically adjusted to just the extent necessary to compensate for the detuning effect of the change in the coupling reactance and the change in the load. This simultaneous adjustment of the reactance devices not only maintains the matched condition and the resonant condition but also maintains the circuit tuned to a constant frequency, so that the device is of value not only with machine generators where the frequency of operation is fixed, but also in circuits containing electronic oscillators where the maintenance of a constant frequency, although not absolutely necessary in order to maintain the matched condition, is highly desirable for other reasons.

Other objects and advantages of the invention will be apparent from the following description when taken in connection with the following drawings, wherein—

Figure 1 is a diagram of a heating apparatus embodying the invention;

Figure 2 is a diagram of a specific form of apparatus embodying an inductive heater and a control system, in accordance with Figure 1;

Figures 3 and 4 are respectively equivalent series and parallel circuits representing any circuit coupling a reactive heater to a generator;

Figure 5 is a vector-impedance diagram illustrating the principles underlying the present invention;

Figure 6 is a view in perspective showing the interconnection between variable condensers employed in the circuit of Figure 2;

Figures 7 and 8 are graphs illustrating the plate shapes of variable condensers employed in the circuit of Figure 2;

Figures 9 and 10 illustrate various forms of tuning and coupling circuits which may be substituted for the circuits shown in Figure 2;

Figure 11 is a view in perspective illustrating a form of interconnection which may be used between the inductive and capacitive coupling and tuning reactances of Figure 9;

Figure 12 is a diagram of another specific form of apparatus embodying a capacitive heater and a control system in accordance with Figure 1;

Figure 13 is a view in perspective illustrating a form of interconnection which may be used between the variable transformer and capacitor coupling and tuning circuits of Figure 11;

Figures 14 to 16 illustrate various forms of coupling and tuning circuits which may be substituted for the coupling and tuning circuits of Figures 2 and 11.

Figure 1 illustrates a heating apparatus consisting of a constant frequency generator 20 connected through a transformer 22, 24 to a tuned heater circuit containing a reactive heater 18, a coupling reactance device 30 in series with the heater, and a tuning reactance device 28 in parallel with the series combination of the heater and coupling reactance. The coupling and tuning reactance devices are adjustable.

Figure 2 shows the same circuit as Figure 1 with the addition of an auxiliary tuning condenser 26 and auxiliary coupling reactances 32 and 34. In this figure, the heater 18 is shown as an inductance heater and the tuning and coupling reactances 26, 30 are shown as variable condensers which are adjusted by a follow-up control device hereinafter described.

In such circuits, if the tuning reactance 28 is always so adjusted as to maintain the natural frequency of the heater circuit equal to the frequency of the generator, the impedance of the heater 18 as reflected into the generator may be matched with the internal resistance of the generator by adjusting the coupling reactance 30 so as to maintain the equivalent parallel resistance of the heater circuit equal to the constant internal resistance of the generator. When such matching is maintained, the voltage across the heating circuit will be held constant provided that the natural frequency of the heater circuit is not changed. The difficulty in practical adjustment of such a circuit lies in the fact that every change in the load impedance and every adjustment of the coupling reactance 30 changes the natural frequency of the heater circuit so as to require an adjustment of the tuning reactance to restore resonant conditions. The voltage across the heater circuit is varied both by changes in the reactance 30 and by changes in the reactance 28, so that it cannot be used as a guide for either of them independently.

My invention provides an interconnection I between the reactances 28 and 30 which makes the reactance of the device 28 such a function of the reactance of the device 30 that adjustment of the reactance 30 to restore matching conditions on change in the heater impedance automatically changes the reactance 28 by just the amount necessary to maintain the natural frequency of the heater circuit unchanged. This connection makes it practical to maintain matching conditions, for on change of the heater impedance it is merely necessary to adjust the two interconnected reactance devices in such manner as to maintain the voltage across the heater circuit at a constant value. This adjustment is preferably made by means of a follow-up control as hereinafter described.

While the need for adjusting both the coupling and tuning in order to match a reactive load to a generator has been recognized, this result has not heretofore been practically obtainable because of the lack of any interconnection between the coupling and tuning reactance devices which would make possible simultaneous adjustment. The possibility of the interconnection provided by my invention arises from the fact that the equivalent series reactance of a high frequency heater does not change materially during the heating operation.

It is known that in the case of both inductance and capacity heaters the heater impedance and the power factor of the heater change during the heating operation. The impedance of the heater may be represented as a pure reactance $X_h$ in series with a pure resistance $R_h$ or as a pure reactance $X_{hp}$ in parallel with a pure resistance $R_{hp}$. I have ascertained by investigation that in the case of capacity heaters the changes in impedance and power factor which occur during heating involve changes in the equivalent parallel resistance $R_{hp}$ and the equivalent series resistance $R_h$ of the heater and in the equivalent parallel reactance $X_{hp}$ of the heater, but do not involve any change in the pure series reactance $X_h$ of the heater, which remains substantially constant throughout the heating unless there is a loss of mass in the dielectric material such as occurs in the heating of materials having a high moisture content. In the case of induction heaters, I have discovered that, despite the observed changes in impedance and power factor, the pure series reactance of the heater varies less than 5% even on changes in the magnetic properties of the metal as it is heated from a temperature below to a temperature above the Curie point.

Figures 3 and 4 are equivalent circuit diagrams representing the coupling and heater reactances and resistances by their equivalent series and equivalent parallel reactances and resistances. In respect to Figure 2, Figures 3 and 4 are equivalent circuit diagrams in which $E_g$ represents the induced or plate voltage of the generator 20, $R_g$ represents the internal resistance of the generator 20, L represents the equivalent pure inductance of the coil 24 and C the equivalent pure capacitances of the loss-free, air, tuning condensers 26 and 28.

Figure 3 is a diagram in which all other reactances of the secondary or heater circuit and the loss resistances of the heater circuit are replaced by an equivalent series circuit, and Figure 4 is a diagram in which they are replaced by an equivalent parallel circuit. The equivalent resistances and reactances indicated in Figures 3 and 4 are related by the vector diagram of Figure 5, if the equivalent parallel resistance $R_p$ is kept constant.

In the equivalent series circuit of Figure 3, $R_s$ is the equivalent series resistance of the heater circuit. It includes the varying series resistance value $R_h$ of the heater which causes variation in the actual heater impedance $Z_h$ even though the pure series reactance $X_h$ of the heater remains at a substantially constant value during the heating period.

The equivalent series resistance $R_s$ of the heater circuit has the value:

$$R_s = R_h + R_c \quad (1)$$

where $R_c$ represents the equivalent series loss resistance of the other heater circuit elements.

As stated above, I have found that the series reactance $X_h$ of the heater remains substantially constant during heating. $R_h$ is therefore a function of the heater impedance $Z_h$ and, consequently, $R_s$ is a function of the impedance $Z_h$.

The equivalent series reactance $X_s$ of Figure 3 equals the reactance $X_v$ of the variable coupling condenser 30, plus a substantially constant reactance $X_0$ which is equal to and represents the constant, series, heater reactance $X_h$ and all other constant series coupling reactances of the heater circuit such as the series reactance of the condenser 32 and the inductance 34 shown in Figure 2. Consequently, $X_s$ is a function of $X_v$.

The equivalent parallel resistance $R_p$ of Figure 4 has the value:

$$R_p = \frac{R_s^2 + X_s^2}{R_s} \quad (2)$$

Since $R_p$ is thus a function of both $R_s$ and $X_s$, it will be changed both by a change in the impedance of the heater and by a change in the setting of the coupling condenser.

The equivalent parallel reactance $X_p$ of Figure 4 has the value:

$$X_p = \frac{R_s^2 + X_s^2}{X_s} \quad (3)$$

$X_p$ is thus a function of both $R_s$ and $X_s$ and is changed both by a change in the impedance of the heater and by a change in the setting of the coupling condenser.

In order to obtain the maximum transfer of energy from the generator to the heater, it is necessary that the impedance of the load, as viewed across the terminals of the L-C circuit and looking toward the load, be equal to the internal impedance of the generator as viewed across the same terminals but looking toward the generator. If resonant conditions are maintained, this result may be achieved by making the equivalent parallel resistance $R_p$ equal to the constant, internal resistance $R_g$ of the generator.

Since, in accordance with Equation (2), the equivalent parallel resistance $R_p$ depends both upon $R_s$, which is a function of the load impedance, and upon $X_s$, which is a function of the setting of the variable coupler, $R_p$ may be maintained constant on a change in the load impedance by setting the variable coupler to compensate for this change. This will, however, achieve the desired matching of the load impedance to the generator impedance only when resonant conditions are maintained, i. e., when the tuner is adjusted to compensate for the changes in $X_p$ which result both from the change in the equivalent parallel reactance $X_{hp}$ of the heater and from the change in the coupling reactance made to compensate for the change in the equivalent series loss resistance $R_h$ of the heater.

Figure 5 is a vector diagram representing the relationships between $R_s$, $X_s$ and $X_p$ when $R_p$ is maintained constant.

It can be seen from Equation (2) that:

$$R_s^2 - R_p R_s + X_s^2 = 0 \quad (4)$$

It will be evident that this is an equation of a circle whose radius is equal to $$\frac{R_p}{2}$$

for this equation may be rewritten as:

$$\left(\frac{R_p}{2} - R_s\right)^2 + X_s^2 = \frac{R_p^2}{4} \quad (5)$$

This, therefore, defines the circle of Figure 5 in which $$\frac{R_p}{2}$$

is the radius, $X_s$ is the Y coordinate and $$\frac{R_p}{2} - R_s$$

is the X coordinate.

In the case of a parallel circuit:

$$\tan \theta = \frac{R_p}{X_p} \quad (6)$$

In the case of a series circuit:

$$\tan \theta = \frac{X_s}{R_s} \quad (7)$$

For these circuits to be equivalent, the power factor angle $\theta$ must be the same. Hence, if $R_s$ and $R_p$ are represented on the same line, then $Z_s$ and $Z_p$ must always vary in such a manner as to remain perpendicular to each other. This means that the locus of the vector $Z_s$ must be a circle, as shown in Figure 5.

It will be clear, from Figure 5 and from combining Equations 6 and 7, that:

$$R_s R_p = X_p X_s \quad (8)$$

It is evident from Equation 2 that if $R_p$ is maintained constant and equal to $R_g$ in order to maintain the matched condition, $X_s$ and $R_s$ become the only variables and that equation, therefore, states a relation between them.

It appears from Equation 3 that $X_p$, which determines the adjustment to be made in the tuner, i. e., condenser 28, is a function of both $R_s$ and $X_s$. But, since $R_s$ and $X_s$, which are adjusted on changes in $R_s$, have a definite functional relationship, as previously described, $R_s$ may be eliminated to define $X_p$ in terms of the single variable $X_s$. An algebraic expression of this function may be obtained by substituting the constant $R_g$ for $R_p$ in Equation 2 and treating Equations 2 and 3 as simultaneous equations and eliminating $R_s$, thus:

$$X_p = \frac{1}{2} \cdot \frac{R_g^2}{X_s} \pm \sqrt{\frac{1}{4} \cdot \frac{R_g^4}{X_s^2} - R_g^2} \quad (9)$$

A simpler statement of the functional relationship between $X_p$ and $X_s$ may be derived trigonometrically from Figure 5, as follows:

$$\sin \alpha = \frac{X_s}{\frac{R_g}{2}} = \sin 2\beta \quad (10)$$

$$2\beta = \sin^{-1} \frac{2X_s}{R_g} \quad (11)$$

but:

$$\tan \beta = \frac{X_p}{R_g} \quad (12)$$

Combining Equations 11 and 12:

$$X_p = R_g \tan\left(\frac{1}{2} \sin^{-1} \frac{2X_s}{R_g}\right) \quad (13)$$

It will be evident from Equations 9 and 13 that, $R_g$ being a constant, $X_p$ is a direct function of $X_s$, and the required value of $X_p$ for each instantaneous value of $X_s$ may be computed by means of either of these equations.

For purposes of computation, the relationship may be expressed more simply by means of an auxiliary variable representing the ratio between $R_p$ and $R_s$. If we let the instantaneous value of this auxiliary variable:

$$a = \frac{R_p}{R_s} = \frac{R_g}{R_s} \qquad (14)$$

then, by substitution in Equation 2:

$$X_s = \frac{R_g \sqrt{a-1}}{a} \qquad (15)$$

From simultaneous Equations 8 and 15, $X_s$ may be eliminated to define $X_p$ in terms of the instantaneous value of the variable $a$, thus:

$$X_p = \frac{R_g}{\sqrt{a-1}} \qquad (16)$$

This equation makes it possible to compute the values of $X_p$ directly from the instantaneous values of $R_s$ if, in a particular case, such computation should be simpler of performance than the computation of $X_p$ from Equation 9 or 13.

It will be evident from the diagram of Figure 5 that as $R_s$ increases between the limits of zero and $$\frac{R_g}{2}$$

$X_s$ and $X_p$ both increase in value, but as $R_s$ increases between $$\frac{R_g}{2}$$

and $R_g$, $X_s$ decreases while $X_p$ increases.

I have discovered, however, that if a heater circuit is properly coupled initially to the generator in such manner, as shown for example in Figure 2, as to match the equivalent parallel resistance $R_p$ of the heater circuit to the internal generator resistance, the equivalent series resistance never exceeds one-half of the equivalent parallel resistance. It will be, therefore, clear from Figure 5 that within the practical limits:

$$R_s > 0 \text{ and } R_s < \frac{R_g}{2} \qquad (17)$$

$X_s$ and $X_p$ will be single valued functions of $R_s$, or of the variable $a$, in accordance with the previously stated equations.

It will be seen from Figure 5 that within these practical limits $X_s$ and $X_p$ will always be of the same character of reactance, i. e. if $X_s$ is capacitive and thus extends, in Figure 5, above the diameter, $X_p$ must also be capacitive and extend above the diameter. If $X_s$ is inductive in character and extends below the diameter, then $X_p$ must be inductive in character and extend below the diameter. This means that if the reactance $X_s$ is initially inductive in character when the variable coupling capacitor is in its minimum reactance setting or position, the coupling and tuning capacitors 28 and 30 could not function to effect the required increase in the inductive reactances $X_s$ and $X_p$ as the resistance $R_s$ increases. By providing an auxiliary series coupling capacitor, where the variable coupler and variable tuner are capacitive in character and the heater inductive in character, the equivalent series reactance $X_s$ may be made initially capacitive in character so that when the resistance $R_s$ increases during heating, the matching and tuning condition can be established by an increase in the capacitive coupling reactance and a decrease in the tuner condenser reactance to compensate for the increased capacitive reactance $X_p$.

Thus, as shown in Figure 2, the coupling condenser 32 may be adjusted preliminary to the heating operation to compensate for the inductive reactance of the heater 18 so that the equivalent series reactance is initially capacitive in character.

Similarly, if the variable coupler is inductive in character and the heater is capacitive, an auxiliary inductor coil 34 between the variable coupler and the heater may be adjusted to provide an initial equivalent series reactance which is inductive in character.

$X_s$ includes, as previously stated, not only the reactance $X_v$ of the variable coupler, but also a constant reactance $X_o$ (Figure 5) equal to the constant equivalent series reactance of the heater, or the resultant constant reactance of the heater and any auxiliary series coupling reactance. The instantaneous values of $X_o$ are:

$$X_s = X_v + X_o \qquad (18)$$

The reactances of different heaters which it may be desired to employ with any particular apparatus will not be of the same magnitude and therefore some means must be provided for compensating for these different initial load reactances in order that the same variable tuner and variable coupler may rematch and retune the circuit. This compensation, to establish a uniform given value of $X_o$, can be effected in many cases by adjustment of the auxiliary coupling condenser 32. However, it is more convenient in some cases, i. e. in the case of an inductive heater coupled to the generator by a variable capacitor coupling, to provide the auxiliary coupling inductor 34 which may be adjusted prior to the heating operation to establish a given value of inductive reactance. In the case of a capacitive heater coupled to the generator by a variable inductor coupling, the auxiliary coupling capacitor 32 may be adjusted to establish initially a given value of capacitive reactance, and the auxiliary coupler 34 adjusted to make the overall coupling reactance $X_s$ initially inductive in character.

For the purpose of computing the relation between the instantaneous values of the reactances to be supplied by the capacitors 30 and 28 of the circuit of Figure 2, Equation 13 may be rewritten as follows:

$$X_{28} = R_g \tan\left[\frac{1}{2} \sin^{-1} \frac{2(X_{30} + X_0)}{R_g}\right] \qquad (19)$$

The relation between the reactances to be supplied by capacitors 30 and 28 is also defined by Equations 15 and 16 taken together. They may be rewritten as:

$$X_{30} = \frac{R_g \sqrt{a-1}}{a} - X_0 \qquad (20)$$

and:

$$X_{28} = \frac{R_g}{\sqrt{a-1}} \qquad (21)$$

To calculate directly the relation between the instantaneous values of the capacitances, these Equations 19, 20 and 21 may be expressed as follows:

$$C_{28} = \frac{1}{\omega} \cdot \frac{1}{R_g \tan\left[\frac{1}{2}\sin^{-1}\frac{2\left(X_0 - \frac{1}{\omega C_{30}}\right)}{R_g}\right]} \quad (22)$$

and:

$$C_{30} = \frac{1}{\omega} \cdot \frac{a}{R_g\sqrt{a-1} - aX_0} \quad (23)$$

and:

$$C_{28} = \frac{1}{\omega} \cdot \frac{\sqrt{a-1}}{R_g} \quad (24)$$

The only independent variable in Equations 23 and 24 is the ratio $a$ of the equivalent series resistance to the internal generator resistance, and hence the required instantaneous values of $C_{30}$ and $C_{28}$ may be readily computed from assumed instantaneous values of $a$ in the practical limits previously mentioned.

The operative connection between two reactance devices such as the condensers 28 and 30 may take numerous different mechanical forms. A simple form is illustrated in Figure 6 where the two condensers have a common operating shaft 35 for causing simultaneous movement of their movable plates. In this case, both condensers are calibrated in such a way that the relation between their reactances complies with the equations which have been stated.

The shapes of the plates of the two condensers may readily be computed from Equations 23 and 24.

In accordance with the well known practice, the capacity of a condenser is computed from the equation:

$$C = \frac{K}{2}\int_0^\alpha r^2 d\alpha \quad (25)$$

where $\alpha$ is the angle of rotation of the condenser plates, $r$ is the instantaneous value of the radius of the plates for any instantaneous value of $\alpha$ and $K$ is a constant determined by the number of plates and their spacing which are so selected that the maximum and minimum dimensions of the plates are within desired limits. For convenience in calculation the angle of rotation $\alpha$ of the plates of the coupling condenser is taken as proportionate to the ratio $a$. The values of $\alpha$ between the limiting angles of 0 and 180° and the corresponding values of the radius of the plates of the condenser 28 and the radius of the plates of the condenser 30 may thus be computed (for a selected number of plates and plate spacings) and set down in tabular form as follows:

| $\alpha$—0 | $r_{30}$—cm. | $r_{28}$—cm. |
|---|---|---|
| 0 | 1.95 | 5.23 |
| 10 | 2.37 | 3.81 |
| 20 | 2.52 | 3.05 |
| 45 | 2.94 | 2.07 |
| 90 | 3.60 | 1.30 |
| 120 | 4.18 | 1.12 |
| 150 | 5.57 | 0.88 |
| 180 | 8.18 | 0.74 |

The condenser plates constructed in accordance with this table are shown in Figures 7 and 8.

It will be evident that the same result can be achieved by providing conventional variable tuning and coupling condensers whose plates are of the same shape but which are interconnected through suitably proportioned mechanical transmission means, i. e. cams, which cause the simultaneous angular adjustment of the plates of the two condensers to just the extent necessary to comply with Equations 23 and 24.

The interconnected condensers which have been described may be simultaneously adjusted manually to effect simultaneous matching and tuning. To do this it is merely necessary to observe the load voltage as indicated by a voltmeter V in Figure 1 connected across the secondary 24, and, whenever the voltage departs from a predetermined value indicating matching and tuning, to adjust the common shaft of the two condensers in such direction as to restore the voltage to its original value.

In accordance with the invention, automatic means may be provided to effect simultaneously these adjustments of the coupler and tuner. A preferred form of control which may be utilized for this purpose is illustrated in Figure 2. This consists of a follow-up control F comprising a D. C. motor F1 of the permanent magnet type having its drive shaft mechanically connected, as indicated by the dotted line F2, to both the tuner condenser 28 and the variable coupling condenser 30. In the preferred form, the follow-up control is actuated or controlled by the voltage across the secondary 24. For this purpose, the primary F3 of a transformer is connected to the secondary 24 and is coupled to the grid circuits by means of secondaries F4 and F5 of Thyratron tubes F6 and F7 connected in back-to-back relation to the alternating current supply line and the armature of the motor F1. The grid circuit of the tube F6 also includes a negative biasing source comprising a voltage divider F8 across a voltage source F9. A negative grid voltage for the tube F7 is derived from the secondary F5, and this grid circuit also includes a positive biasing voltage source comprising a divider F10 and a voltage source F11. The voltage dividers F8 and F10 are adjusted to cause the tube F6 to fire when the voltage across the secondary 24 rises above the matching value and the tube F7 to fire when the voltage of the secondary 24 falls below the matching value. The tube F6 permits current to flow in one direction through the armature of the motor and the tube F7 permits current to flow in the opposite direction through the armature of the motor. Therefore, when the resonant voltage of the heater circuit becomes greater than the matching value, the motor F1 simultaneously adjusts the tuning and coupling condensers 28 and 30 in a direction to reduce the resonant voltage to the matching value. When the resonant voltage of the heating circuit falls below the matching value, the motor F1 simultaneously adjusts the tuning and coupling condensers in the opposite direction, thereby to increase the resonant voltage and restore it to the matching value.

It will be understood that the follow-up control illustrated in Figure 2 may be replaced by other forms of voltage or current controlled reversing circuits operating other electrically operable, reversible driving elements mechanically connected to the adjustable tuning and coupling reactances.

As shown in Figure 9, the inductive heater 18 may be coupled to the secondary 24, the condenser 26 and tuner condenser 28 by the variable coupling conductor 36 and the auxiliary variable inductance 38. As indicated by the dotted line 40, the tuner condenser 28 and the variable inductor coupling 36 may be interconnected for simultaneous operation. The generator may be a machine generator of high frequency or an electronic oscillator of high radio frequency. The follow-up control F may be connected to the secondary circuit as indicated and as described with reference to Figure 2 to adjust simultaneously and automatically the tuner condenser 28 and the inductor coupler 36.

In this case, for the purpose of computing the coupling and tuning inductance and capacitance, Equations 22, 23 and 24 may be rewritten as follows:

$$C_{28} = \frac{1}{\omega} \cdot \frac{1}{R_g \tan\left[\frac{1}{2}\sin^{-1}\frac{2(\omega L_{90} + X_0)}{R_g}\right]} \quad (26)$$

and:

$$L_{26} = \omega \cdot \frac{R_g\sqrt{a-1} - aX_0}{a} \quad (27)$$

and:

$$C_{28} = \frac{1}{\omega} \cdot \frac{\sqrt{a-1}}{R_g} \quad (28)$$

Since the variable coupler is in this form of the invention an inductor, it is most convenient to provide between the tuner condenser 28 and the coupling inductor 36 a mechanical connection such that the condenser and inductor are moved properly related distances in compliance with these equations. One way in which this may be accomplished is illustrated in Figure 10. The shaft 40, driven by the adjusting motor of the follow-up control as described with reference to Figure 2, is connected to the variable condenser 28 through suitable intermeshing gears as shown, and the shaft carries a cam 42 which engages with a cam roller 44 secured to a rack 46 meshing with a gear 48 on the adjusting shaft 50 of the variable coupling inductor 36. The cam 42 is designed in the same manner as previously described with reference to the design of the shape of the plates of the condenser 30, so as to cause the variometer to be adjusted to just the extent necessary to maintain the matched condition, while the plates of the condenser 28 are designed, as previously described, to provide just the amount of capacitance required to retune the circuit to the constant frequency.

As shown in Figure 11, the generator 20 is coupled to the inductive heater 18 through an adjustable transformer 52 having its primary winding shunted by a condenser 54. The heater is connected to the secondary of the transformer through a variable coupling inductor 56 and an auxiliary coupling condenser 58. The adjusting shaft of the adjustable transformer 52 and the adjusting shaft of the inductor 56 are interconnected as represented by the dotted line 60. The adjustable transformer provides the variable coupling between the heater circuit and the generator, while the variable inductor 56 provides a tuning compensator. The follow-up control F is, in this case, connected across the tuned primary circuit of the transformer.

For the simultaneous adjustment of the coupling transformer 52 and the tuning compensation inductor 56, the follow-up control motor may have on its shaft a pair of cams, similar to the cam 42 of Figure 10, which are designed, as previously explained, so that on adjustment of the transformer to rematch the load to the generator, the tuning compensator will be simultaneously adjusted to just the extent necessary to retune the circuit to the constant frequency.

As shown in Figure 12, a capacitive heater 62 may be connected to a generator 64, which may be an electronic or other radio frequency oscillator, through a variable air core coupling transformer 66 having its primary winding tuned initially by the shunting condenser 68. Its secondary winding is shunted by the variable tuner condenser 70 and the capacitive heater may be connected directly across the secondary or through auxiliary coupling reactances, such as 32 and 34, as illustrated in Figure 2. The adjusting shaft of the variable transformer and the adjusting shaft of the variable tuner condenser may be interconnected as indicated by the dotted line 72. The follow-up control is connected across the tuned primary circuit.

Figure 13 illustrates one form of air core coupling transformer which may be employed for the coupling transformer 66 in Figure 12. As shown in Figure 13, the air core coupling transformer 66 comprises a pair of axially spaced interconnected windings 74 and 76 between which is mounted for swinging movement the secondary winding 78, by means of which the coupling between the primary and secondary winding is varied as required. For this purpose the secondary winding 78 may be mounted on a lever 80 pivoted at 82 and geared to the operating member or rack 44 of the follow-up control as described with reference to Figure 10. The tuner condenser 70 is simultaneously adjusted through gearing from shaft 40.

Figure 14 illustrates another form of variable transformer coupling comprising a transformer having a primary winding 84, secondary windings 86 and 88 and tertiary winding 90. The winding 84 is tuned by condenser 68 and connected to the oscillation generator 64. The winding 86 is loosely coupled to the winding 84. The tertiary winding 90 forms a variable transformer with the winding 88 so that the relative angular adjustment of these windings varies the coupling to the load. The windings 86, 88 and 90 are connected in a series circuit shunted by tuner condenser 70. The adjusting shaft of the tuner condenser and the adjusting shaft of the variably coupled windings are interconnected as indicated. The variably coupled windings may be arranged in a manner similar to that shown in Figure 13 and similarly interconnected to the tuner condenser for simultaneous adjustment. The follow-up control is preferably connected across the primary circuit.

Figure 15 illustrates an inductive coupling and inductive retuning circuit which may be substituted for the capacitive coupling and capacitive retuning circuit of Figure 2. As here shown, it also connects a capacitive heater to the oscillation generator. The secondary winding of the variable coupling transformer 66 is connected to the heater through the variable, series, inductor tuner or variometer 94, and the auxiliary series, coupling condenser 96. The tuning and coupling adjusters are interconnected as indicated. Where desired an auxiliary adjustable, series coupling inductor, similar in purpose to the condenser 32 of Figure 2, may also be included. The follow-up control is, in this case, preferably connected across the primary circuit.

In Figure 16 the capacitive heater is directly connected to intermediate taps on the tank circuit winding 98 of the oscillation generator 64 through an interconnected pair of series, coupling condensers 100. The tank coil is shunted by tank condensers 102 and 104, the variable tuner 104 being interconnected, in a manner as previously described, with the coupling condensers 100, as indicated. The follow-up control is connected across the tank circuit.

In applications of high frequency heating for electrostatically drying dielectric materials having relatively large percentages of moisture, appreciable variations in the equivalent series reactance of the heater may occur during heating. In the circuit shown in Figure 16 the heater reactance, at the frequencies employed, forms a small part only of the reactance of the frequency determining circuit of the oscillator, and the changes of the equivalent series reactance of the heater during heating effect only an inappreciable change in the capacitive reactance of the circuit. The adjustment of the coupling condensers to restore the matched condition has a far greater effect on the total capacitive reactance of the circuit and hence on the frequency of operation of the oscillator. Therefore no substantial error is introduced in neglecting the change in the equivalent series reactance of the capacitive heater when computing the instantaneous values of the coupling and tuning reactances according to Equations 20 and 21. It will be evident that the instantaneous values of the compensating tuner reactance across the tank circuit will be proportionate to the values determined by these equations in the square of the ratio of the coupling of the whole tank coil to the portion of the tank coil between the taps.

While certain specific structural details have been disclosed and described herein for the purpose of illustrating certain embodiments of my invention, it will be apparent that other modifications and changes may be made without departing from the spirit and scope of the appended claims.

I claim:

1. In high frequency heating apparatus, a high, constant frequency generator, a reactive heater, a parallel resonant supply circuit connecting the heater to the generator, a first variable reactance means in series with the heater in said supply circuit, a second variable reactance means in shunt to said heater and said first reactance means in said supply circuit, electric motor means for simultaneously adjusting said reactance means, and motor control means connected to said supply circuit and responsive to voltage across the circuit to operate the motor means in accordance with the changes in said voltage during the heating operation, said reactance means being proportioned to maintain resonance and matched conditions in the supply circuit.

2. In high frequency heating apparatus, the combination of a high frequency generator, a reactive heater and a parallel resonant circuit connecting the heater to the generator, a pair of adjustable reactance means in said circuit, one of said means being connected to vary the ratio of coupling of the heater to the generator and the other being connected to tune the circuit to the frequency of the generator, said reactance means being proportioned to maintain, upon simultaneous adjustment, the circuit tuned for each incremental adjustment of the coupling varying reactance means, and means for simultaneously adjusting said pair of reactance means, said adjusting means including means mechanically connected to said reactance means and connected to said circuit and responsive to the resonant voltage of said supply circuit for maintaining resonance and matched conditions.

EUGENE MITTELMANN.

REFERENCES CITED

The following references are of record in the file of this patent:

UNITED STATES PATENTS

| Number | Name | Date |
|---|---|---|
| 1,882,684 | Achard | Oct. 18, 1932 |
| 1,940,228 | Polydoroff | Dec. 19, 1933 |
| 1,976,571 | Loftis | Oct. 9, 1934 |
| 1,998,322 | Kaar | Apr. 16, 1935 |
| 2,124,211 | Roberts | July 19, 1938 |
| 2,147,689 | Chaffee | Feb. 21, 1939 |
| 2,303,214 | Labin et al. | Nov. 24, 1942 |
| 2,304,958 | Rouy | Dec. 15, 1942 |
| 2,324,525 | Mittelmann | July 20, 1943 |
| 2,358,454 | Goldstine | Sept. 19, 1944 |
| 2,415,799 | Reifel et al. | Feb. 11, 1947 |